Feb. 4, 1930. C. B. KING ET AL 1,745,995
STEERING MECHANISM
Filed Nov. 25, 1922
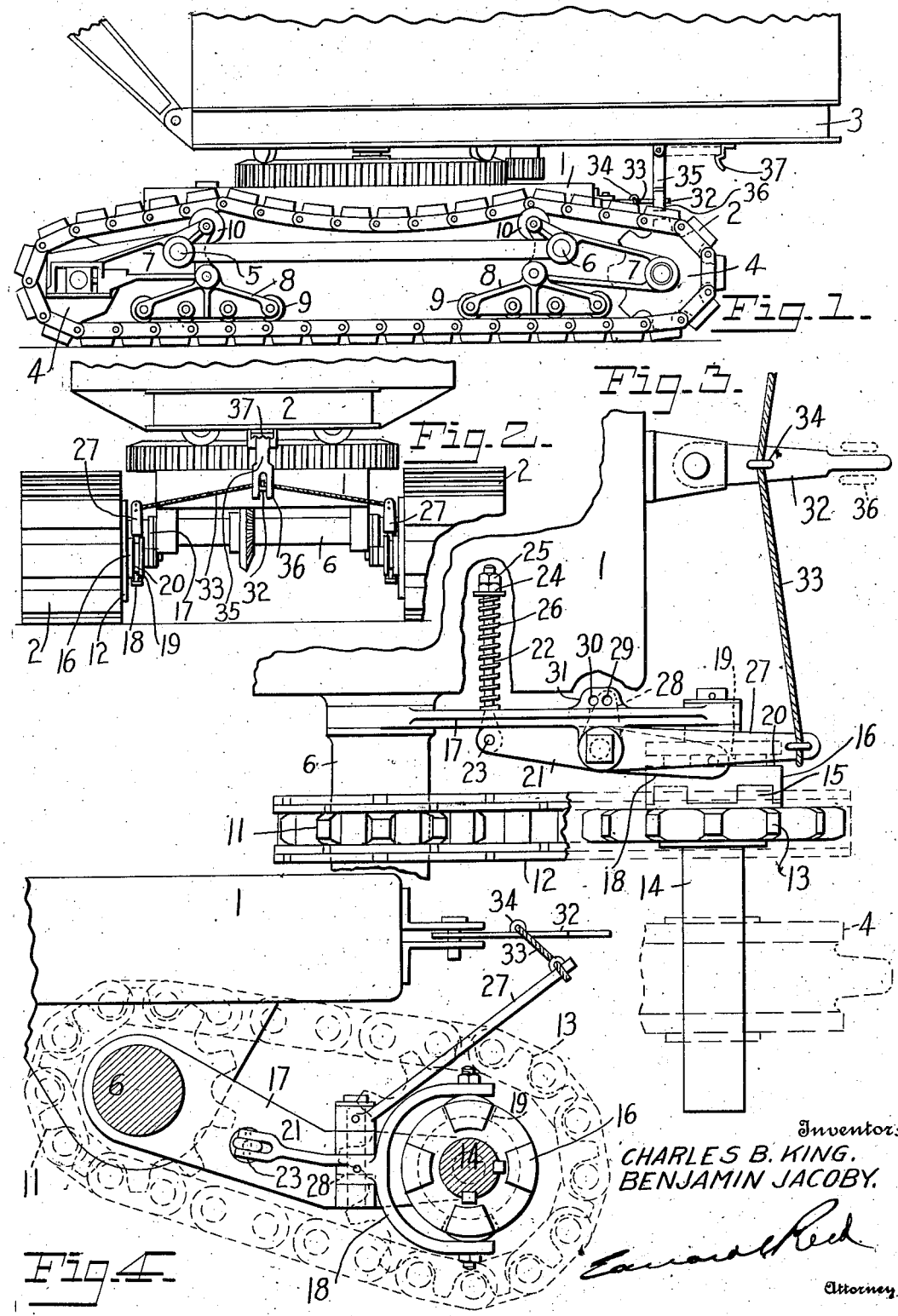
Inventors
CHARLES B. KING.
BENJAMIN JACOBY.

Patented Feb. 4, 1930

1,745,995

UNITED STATES PATENT OFFICE

CHARLES B. KING AND BENJAMIN JACOBY, OF MARION, OHIO, ASSIGNORS TO THE MARION STEAM SHOVEL CO., OF MARION, OHIO, A CORPORATION OF OHIO

STEERING MECHANISM

Application filed November 25, 1922. Serial No. 603,328.

This invention relates to steering mechanisms and more particularly to means for steering excavating mechanisms and other self-propelled devices having a revolving platform or the like.

One object of the invention is to provide means controlled by the revolving platform and operating through the driving mechanism to so regulate the application of power to the traction devices as to cause the machine to be steered.

A further object of the invention is to provide such a mechanism in which the traction devices will be connected with the driving mechanism by separately operable clutches, and which will have means controlled by the revolving platform to operate said clutches selectively.

A further object of the invention is to provide a steering mechanism of this kind which can be operated either by hand or by the revolving platform.

Other objects of the invention will appear as the device is described in detail.

In the accompanying drawings Fig. 1 is a side elevation of a portion of an excavating mechanism showing our invention applied thereto; Fig. 2 is a rear elevation of the lower portion of such a mechanism, partly broken away; Fig. 3 is a plan view of the clutch and clutch actuating device; and Fig. 4 is a side elevation, partly in section, of the clutch actuating mechanism.

In these drawings we have illustrated one embodiment of our invention and have shown the same as applied to a steam shovel of the revolving type which is equipped with crawling traction mechanism. It will be understood, however, that the invention may be applied to excavating devices of various kinds, or to other devices, embodying a revolving structure and that may be used in connection with traction devices of various kinds.

In the particular construction here shown the excavating mechanism comprises a base or main frame 1 supported at its opposite sides by traction devices 2 which, in the present instance, are in the form of endless belts constituting what are known as crawling traction mechanisms. Mounted upon the base 1 is a revolving platform 3 which, in the present machine, carries the excavating mechanism and the power plant and which is mounted on the base and rotated thereon in a well known manner. The traction devices may be of any suitable kind but, as has been stated, we have here shown crawling traction mechanisms each comprising an endless belt 2 which extends about wheels or drums 4 having teeth to engage the endless belts after the manner of a sprocket wheel. In the particular construction here shown the base 1 is provided at its front and rear ends with axles 5 and 6, which project beyond the sides of the base and have pivotally mounted on each end thereof, supplemental frame members 7, upon the outer ends of which the drums 4 are rotatably mounted. Upon the inner ends of the supplemental frames 7 are mounted brackets 8 carrying rollers 9 which bear upon the upper surface of the lower stretch of the endless belt or track. The inner ends of the supplemental frames 7 also carry other rollers 10 which support the upper stretch of the endless belt. It will be understood that this particular type of traction mechanism has been shown for the purpose of illustration only and that the invention may be applied to any crawling mechanism.

The rear axle 6 constitutes a driving shaft for the traction devices and to this end it has provided on the inner side of the supplemental frame 7 with a sprocket wheel 11 which is connected by a sprocket chain 12 with a sprocket wheel 13 mounted on the shaft 14 which carries the drum 4 at the driving end of the crawling traction belt. It will be understood that each traction mechanism is independably driven from the axle 6 through sprocket wheels and chains such as described. It is customary to steer a crawling traction mechanism by varying the relative speed of the two traction devices, this usually being accomplished by stopping one traction device while the other continues its movement. To enable this to be done we have connected th two traction devices with the driving mech ism by clutches which can be separately operated to disconnect a selected one of the traction devices. As here shown the sprocket wheel 13 of the traction device has formed integral therewith clutch teeth 15 which constitute one member of the connecting clutch. A second clutch member 16 is slidably mounted on the shaft 14 but is held against rotation thereon. The sprocket wheel 13 is loosely mounted on the shaft and consequently when the clutch member 16 is out of engagement with the clutch member 15 the sprocket wheel 13 will run free on the shaft and no movement will be imparted to the traction mechanism. Any suitable means may be provided for actuating the clutch member but, as here shown, the inner end of each shaft 14 is supported in an arm 17 which extends rearwardly from the axle 6 and we have mounted on this arm a clutch shifting lever one end of which is in the form of a yoke 18 having pins 19 extending into a circumferential groove 20 in the clutch member 16. The clutch member 16 may be held normally in its operative position, that is, in interlocking engagement with the clutch member 15, in any suitable manner but we have in the present construction shown the clutch shifting lever as having a portion 21, extending on that side of its axis opposite the yoke 18, which is acted upon by a spring to hold the clutch member normally in its operative position. As here shown a rod 22 is pivotally connected with the portion 21 of the lever, as shown at 23, and extends through the arm 17 and is provided at its free end with a stop 24 which, in the present instance, consists of a washer which is held in adjusted positions by a nut 25. Coiled about the rod 22 and confined between the arm 17 and the stop 24 is a spring 26 which so acts upon the clutch actuating lever as to move the clutch member into its operative position. The clutch operating lever may be shifted in various ways but as here shown we have rigidly connected therewith an arm 27 the movement of which will move the yoke and thus shift the clutch member. The clutch may be locked in its inoperative position in any suitable manner, as by providing the clutch operating lever with a lateral extending arm 28 which has an opening 29 adapted to register with an opening 30 in a lug 31 carried by the arm 17. The openings, 29 and 30, are so arranged that they will register one with the other when the clutch member is in its inoperative position and they may be retained in this position by inserting a pin through the openings. If desired a second opening may be provided in the lug 31 to register with the opening 29 when the clutch is in its operative position but ordinarily the spring 26 will satisfactorily retain the clutch in its operative position.

It will be understood that each traction device is provided with means for connecting the same with and disconnecting the same from the driving mechanism as has been above described. In order that either connecting means may be rendered inoperative independent of the other, and from a single point conveniently arranged for operation, we have mounted upon the base 1 an operating handle 32 which, in the present instance, is mounted for movement about a vertical axis and is so connected with the two actuating arms 27 that when moved in one direction it will move the clutch member of one device into its inoperative position without affecting the clutch member of the other connecting device, and when moved in the opposite direction will move the last mentioned clutch member into its inoperative position without affecting the position of the first mentioned clutch member. In the present construction the connection between the handle 32 and the clutch shifting lever 27 is of a flexible character and may consist of a cable, as shown at 33, this cable being rigidly connected at its ends with the respective levers 27 and rigidly connected between its ends with the handle 32, this latter connection, in the present instance, being accomplished by a clamping device or clip 34. This handle 32 may be manually operated to shift either clutch but we prefer to utilize power for shifting the clutches and to this end we have provided means for connecting the revolving structure or platform 3 with the handle 32 in such a manner that the revolving movement of that platform will control the clutches. This connection may take various forms but as here shown it is in the form of an arm 35 mounted on the platform 3 and having a bifurcated end, as shown at 36, adapted to be moved into and out of operative relation with the handle 32. In the present instance the arm 35 is pivotally mounted on a horizontal axis and when the revolving platform is in its normal or central position the arm 35 will move downwardly and embrace the handle 32, thus establishing a connection which will cause the handle to be operated whenever the revolving movement is imparted to the platform. During the normal operation of the mechanism, that is, when it is not desired to utilize the revolving movement of the platform for steering purposes the arm 35 is held in an inoperative position, as by means of a spring catch 37.

The operation of the mechanism will be readily understood from the foregoing description thereof and it will be apparent that we have provided a very simple but highly efficient mechanism whereby the revolving movement of the platform or cab of a power shovel may be utilized to control the connections between the traction devices and the driving mechanism and thus steer the mechanism when the latter is traveling under its own power.

While we have shown and described one embodiment of our invention we wish it to be understood that we do not desire to be limited to the details thereof as various modifications may occur to one skilled in the art.

Having now fully described our invention what we claim as new and desire to secure by Letters Patent, is:

1. In a mechanism of the character having a driving mechanism described including driving mechanism, a frame, a structure revolubly mounted on said frame, traction devices arranged at the respective sides of said frame, separately operable means for connecting the respective traction devices with said driving mechanism, an operating device adapted to be manually operated connected with one of said connecting means by a flexible member, and a part carried by said revoluble structure and movable into and out of operative relation to said operating device to disconnect a selected traction device from the driving mechanism.

2. In a mechanism of the character described including driving mechanism, a frame, a structure rotatably mounted on said frame, a traction device arranged on each side of the frame, clutch means for connecting each traction device to the driving mechanism, a lever for each clutch pivotally mounted on the frame and to the clutch for operating the clutches, a flexible connection between the levers, means connected to the frame and to the flexible connection to shift the clutches, and means attached to the rotatably mounted structure and adapted to engage the last-named means to shift the clutches by the rotation of the rotatably mounted structure.

3. In a mechanism of the character described including driving mechanism, a frame, a structure rotatably mounted on said frame, a traction device arranged on each side of the frame, clutch means for connecting each traction device to the driving mechanism, a lever for each clutch pivotally mounted on the frame and to the clutch for operating the clutch, a flexible connection between the levers, means connected to the frame and to the flexible connection adapted to be manually operated to shift the clutches, and means attached to the rotatably mounted structure and adapted to engage the last-named means to shift the clutches by rotation of the rotatably mounted structure.

In testimony whereof, we affix our signatures hereto.

CHARLES B. KING.
BENJAMIN JACOBY.